United States Patent Office 3,556,696
Patented Jan. 19, 1971

3,556,696
SPHERICAL MOTOR
Riccardo Bertoni, Via Giacomo Leopardi 11,
Viareggia, Lucca, Italy
Filed Jan. 23, 1969, Ser. No. 793,452
Claims priority, application Italy, Jan. 26, 1968,
10,501/68
Int. Cl. F01c 3/00
U.S. Cl. 418—68      5 Claims

ABSTRACT OF THE DISCLOSURE

A spherical motor comprising a pair of spherical sectors pivotally connected to each other, accommodated in a hollow sphere so as to move in opposite directions with a spherical movement obtained by the inverse rotation of the two crank throws in the generation of two opposed cones having their vertexes in the centre of the sphere articulated on the axes of the sectors perpendicularly to the axis of the hinge point and the shaft of the crank on the axes of the described cones.

---

This invention relates to a spherical motor composed of a pair of spherical sectors pivotally connected to each other and accommodated in a hollow sphere composed of two halves so as to move with a spherical movement in opposite directions.

The spherical sectors are connected to each other on their diameters by means of a hinge the diametrical axis of which passes through the centre of the hollow sphere and on the outside a pin is secured on the medium line of each sector perpendicularly to the hinge and extends outwardly to be driven with a circular movement.

The pins are firmly secured to the spherical sectors and each received in an inclined hole with the vertex directed to the centre of the sphere, the holes being located in two different opposed toothed wheels. The toothed wheels have their teeth on the outside and rotate in opposite directions on the axis of the centre of the sphere, being connected by gearings. The pins or shafts serving as axles for rotation of the spherical sectors during such rotation generate a cone whose vertex is at the centre of the sphere and the spherical sectors describe a spherical path of movement so as to form chambers likewise in the form of a sector of a circle and of a volume which is variable between zero and a maximum dimension due to the inverse movement of the sectors, the chambers being utilized to produce a working cycle of the motor.

The kinematics of the spherical motor according to the invention are adapted to replace the piston of conventional motors and suitable for application in endothermic and exothermic engines, hydraulic, pneumatic and vacuum pumps, compressors of all types, hydraulic engines and generators, deflectors and distributors for any application.

The present spherical motor may also be constructed with a single spherical sector capable of spherical movement and with the other sector adapted for oscillating movement. This embodiment is suitable for application to deflectors and distributors in which the spherical movement permits the opening and closing of slots provided in a hollow sphere (heads of endothermic, exothermic and similar motors).

The accompanying drawings show, merely by way of a non limiting example, a preferred embodiment of the motor according to the invention, which, however, in its practical realization may be variously modified according to practical and constructional requirements without departing from the scope of the invention, so that all such modifications designed to improve its conditions of performance, efficiency and application form part of the invention.

Figure 1:
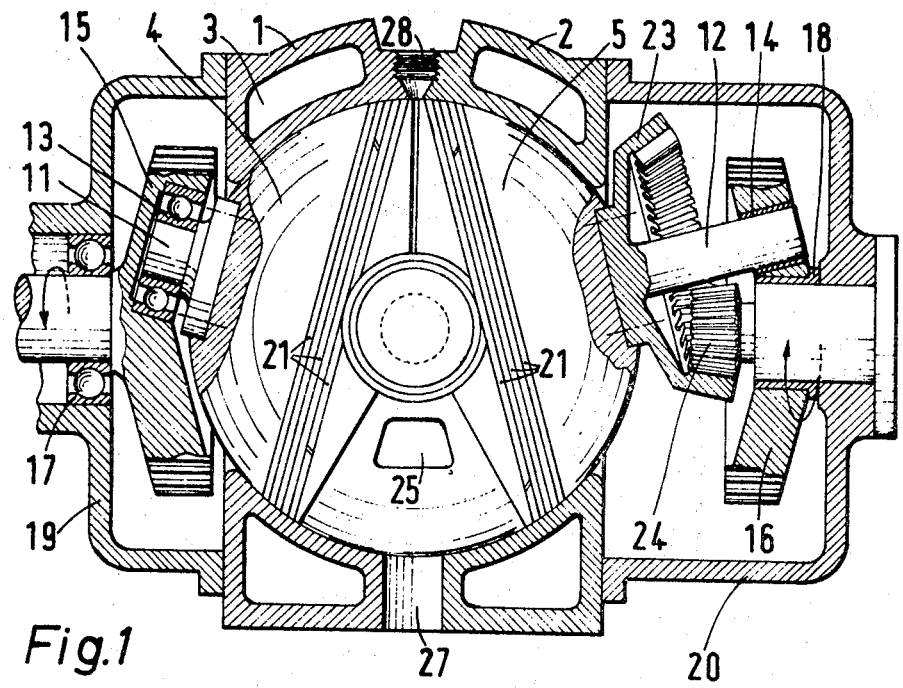
FIGS. 1 and 2 show an endothermic motor in two schematical perpendicular sections.
Figure 2:
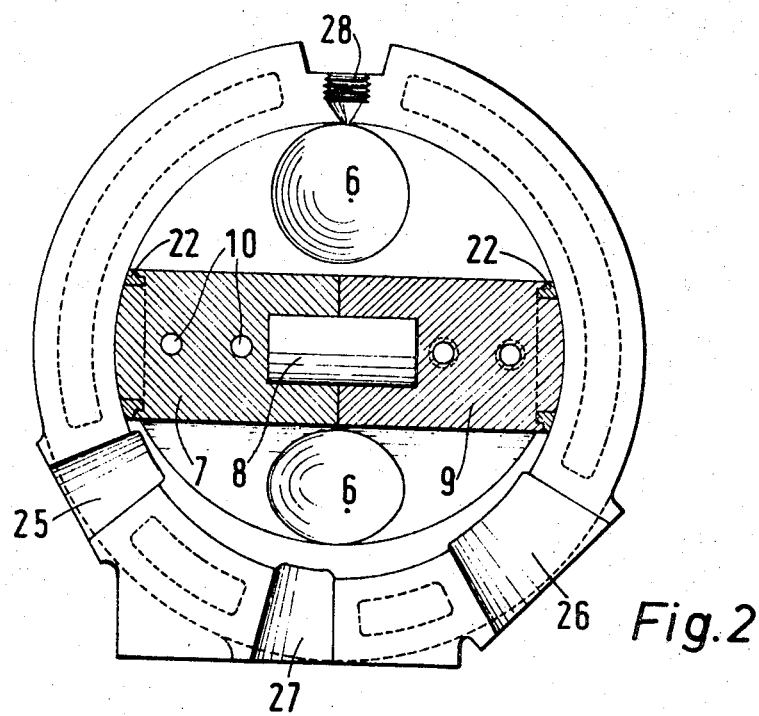

The motor comprises a casing composed of two halves 1 and 2 which are coupled together, the casing being in the form of a hollow sphere provided with cooling chambers 3 and accommodating two spherical sectors 4 and 5 having explosion chambers 6 on their faces. The spherical sectors are connected to each other by a hinge composed of the elements 7, 8 and 9. The elements 7 and 9 have a substantially cylindrical form and are secured to the vertexes of the sectors 4 and 5, respectively, by a series of screws screwed into holes 10. The element 8 is accommodated in cylindrical recesses provided in the adjacent end faces of the elements 7 and 8 and serves as a pivot for the hinge. Each of the spherical sectors 4 and 5 carries at the end opposite the hinge a pin 11 or 12, respectively, firmly secured thereto by known means. The pins 11 and 12 are rotatably mounted in bearings 13 and 14 carried by toothed wheels 15 and 16 which are connected by gearings (not shown) so as to rotate in opposite directions in appropriate bearings 17, 18 on coaxial supports 19, 20, respectively, whose theoretical axes pass through the centre of the sphere. During the rotation of the toothed wheels 15, 16 in opposite directions, the pins 11, 12, whose axes pass through the centre of the hollow sphere, describe a cone and produce a spherical movement of the sectors 4, 5 and so produce angular movements of the faces of the sectors and generate spaces varying between a minimum and a maximum volume, the sectors working as a piston and replacing it. The spherical sectors 4 and 5 are provided with a series of circular elastic sealing strips 21 of different diameters. The elements 7 and 9 of the hinge are also provided with elastic strips 22 which are located at their ends and intersect alternately with the strips 21 to ensure sealing between the sector chambers.

The distribution of the phases in a cycle of the endothermic motor is effected by a conical crown wheel 23 provided with internal teeth and secured to the spherical sector 5 and coupled to a pinion 24 mounted on the support 20. The toothed wheel 16 mounted in the bearing 18 runs idle on the axle of the pinion 24. The transmission of the movement may also be effected by other conventional systems. During the spherical movement of the sectors 4 and 5, the pair of wheels 23, 24 causes a circular movement of the sectors at an appropriate ratio to permit the successive execution of the phases in a working cycle.

The hollow sphere is provided with conduits 25 and 26 serving for intake and exhaust, respectively, whereas the conduit 27 serves for scavenging. The position of the spark plug is indicated by 28. Obviously also conventional means may be used for distribution in the spherical motor, such as valves, distributors or rotary discs, laminar discs and the like.

Figure 3:
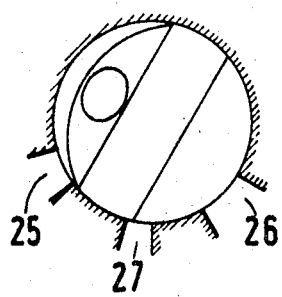
FIGS. 3 to 8 show the motor schematically in the various phases of the working cycle.
Figure 4:
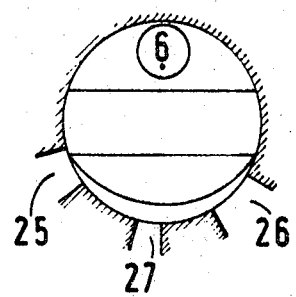
Figure 5:
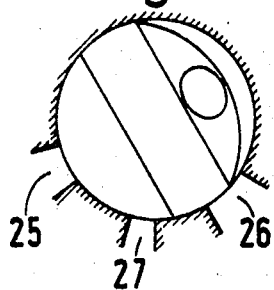
Figure 6:
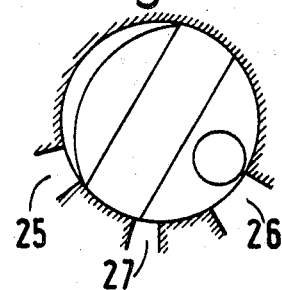
Figure 7:
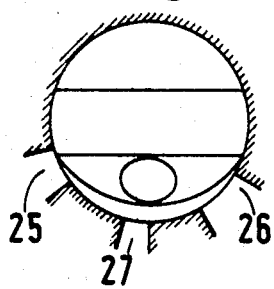
Figure 8:
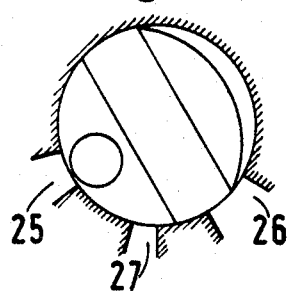

The operation of the motor is as follows:

By rotating the shaft of the toothed wheel 15 in the direction of the arrow the intake phase is started. As shown in FIG. 3, the intake phase is already completed up to the maximum angular opening of the two spherical sectors. FIG. 4 shows the phase after compression has taken place by closing of the sectors and simultaneously ignition occurs. FIG. 5 shows the expansion phase, the sectors are open and exhausting is started. In FIG. 6 exhausting is completed. FIG 7 shows the air scavenging phase while FIG. 8 shows the beginning of the intake phase and so on. Obviously each described phase has a corresponding diametrically opposed different phase like a two-cylinder engine and the ignitions succeed alternately from one to the other pair of chambers so that one explosion occurs per each 180°.

I claim:

1. A spherical motor comprising a pair of spherical sectors pivotally connected to each other at their opposed flat faces, accommodated in a hollow spherical housing and eccentrically driven by gear means mounted on a pair of coaxial supports outwardly of said housing so as to move in opposite directions with a spherical movement obtained by the inverse rotation of the spherical sectors in the generation of two opposed cones having their vertexes in the center of the sphere articulated on the axes of the spherical sectors perpendicularly to the axis of the hinge point between said spherical sectors.

2. A spherical motor as claimed in claim 1, wherein the inverse spherical movement of the spherical sectors generates chambers of variable volume.

3. A spherical motor as claimed in claim 1, wherein the spherical sectors are arranged to provide not only a spherical movement in opposite directions, but also a rotary movement within the sphere, the two movements occurring simultaneously, and the ends of the hinge simultaneously describe a sinusoid so as to obtain at least one phase distribution cycle.

4. A spherical motor as claimed in claim 3, wherein one of the spherical sectors is arranged for spherical movement and the other for oscillating or reciprocating and rotating or only reciprocating movement.

5. A spherical motor as claimed in claim 3, wherein one of the spherical sectors carries at the apex of its spherical surface a projecting pin rotatably eccentrically mounted in a first toothed wheel having a drive shaft formed integrally therewith and rotatably mounted in one of the coaxial supports whereas the other spherical sector at the apex of its spherical surface carries a projecting pin rotatably eccentrically mounted in a second toothed wheel arranged for idle movement on a shaft of a conical pinion mounted on the other of the coaxial supports to mesh with inner teeth of a crown wheel, said crown wheel surrounding said projecting pin rotatably eccentrically mounted in said second toothed wheel, said projecting pin being formed integrally with a base portion of said crown wheel, said crown wheel and associated conical pinion serving to produce spherical rotation of the spherical sectors in opposite directions and being exchangeable to accommodate various speed ratios between said spherical sectors, the flat surface of each spherical sector being provided with an elongated substantially cylindrical element screwed thereto, the two cylindrical elements being aligned and provided with a cylindrical recess at their respective adjacent end faces, said recesses accommodating a pivot serving as hinge means between the spherical sectors to permit relative oscillating movement therebetween.

References Cited

UNITED STATES PATENTS

| | | | |
|---|---|---|---|
| 15,173 | 6/1856 | Carpenter | 103—117 |
| 425,213 | 4/1890 | Eastman | 91—77 |
| 607,085 | 7/1898 | Roux | 91—77 |
| 769,082 | 8/1904 | Hendricks | 103—127 |
| 2,094,143 | 9/1937 | Cady | 103—117 |
| 2,897,761 | 8/1959 | Roy, Jr. | 103—133 |

FOREIGN PATENTS

| | | | |
|---|---|---|---|
| 21,868 | 9/1961 | Germany | 103—133 |

CARLTON R. CROYLE, Primary Examiner

W. J. GOODLIN, Assistant Examiner